(12) United States Patent
Nagamine et al.

(10) Patent No.: US 7,680,360 B2
(45) Date of Patent: Mar. 16, 2010

(54) INFORMATION PROCESSING SYSTEM AND INFORMATION PROCESSING METHOD

(75) Inventors: Takeshi Nagamine, Kanagawa (JP); Yutaka Andoh, Kanagawa (JP); Kengo Omura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1084 days.

(21) Appl. No.: 11/338,830

(22) Filed: Jan. 25, 2006

(65) Prior Publication Data
US 2007/0041666 A1 Feb. 22, 2007

(30) Foreign Application Priority Data
Aug. 16, 2005 (JP) ............... 2005-236176

(51) Int. Cl.
*G06K 9/60* (2006.01)
(52) U.S. Cl. .............. 382/305; 382/278; 382/282
(58) Field of Classification Search ........ 382/209, 382/219, 282, 305; 707/3, 6
See application file for complete search history.

(56) References Cited

U.S. PATENT DOCUMENTS

| | | | |
|---|---|---|---|
| 5,396,588 A * | 3/1995 | Froessl | 715/234 |
| 5,444,840 A * | 8/1995 | Froessl | 707/2 |
| 5,870,771 A * | 2/1999 | Oberg | 715/202 |
| 6,363,411 B1 * | 3/2002 | Dugan et al. | 709/202 |
| 6,532,461 B2 * | 3/2003 | Evans | 707/3 |

FOREIGN PATENT DOCUMENTS

| | | |
|---|---|---|
| JP | A 10-055391 | 2/1998 |
| JP | A 2000-125274 | 4/2000 |
| JP | A 2005-234722 | 9/2005 |

* cited by examiner

*Primary Examiner*—Yosef Kassa
(74) *Attorney, Agent, or Firm*—Oliff & Berridge, PLC

(57) ABSTRACT

An information processing system includes a memory portion that stores image information of a space in association with a document, the image information being captured by an image capturing portion, the document being used while the space being captured, a receiving portion that receives information that specifies the document as a search request, and a search portion that searches the image information stored on the memory portion for a scene associated with the document specified by the search request, on the basis of the search request.

22 Claims, 17 Drawing Sheets

FIG. 2

ID: 0014, DATE 20050210, PLACE: 11, MEMBER; A;E;F;G, DEVICE: T, TIME 10:34:00-11:55:45
DOCUMENT http://www.fujixerox.co.jp/meeting/stored/20050210_11_1034/topic.html ID: 0015, DATE 20050212, PLACE: 12, MEMBER; A;B;D, DEVICE: Y, TIME 13:51:00-15:12:30
DOCUMENT: DOCUMENT F ID: 0016, DATE 20050214, PLACE: 11, MEMBER; A;C;G;J, DEVICE: Z, TIME 14:02:12-14:57:25
DOCUMENTS: DOCUMENT A, DOCUMENT C
IMAGE: VIDEO 0016.mpg
OPERATION STATE:
00:00:00 | A:132 | C:000 | G:000 | Z:035;
00:00:01 | A:132 | C:000 | G:056 | Z:035;
00:00:02 | A:032 | C:000 | G:056 | Z:035;
00:00:03 | A:032 | C:000 | G:056 | Z:035;
00:00:04 | A:032 | C:000 | G:055 | Z:035;
00:00:05 | A:032 | C:000 | G:055 | Z:035;
00:00:06 | A:032 | C:000 | G:054 | Z:135;
00:00:07 | A:032 | C:012 | G:044 | Z:135;
:
:

FIG. 8

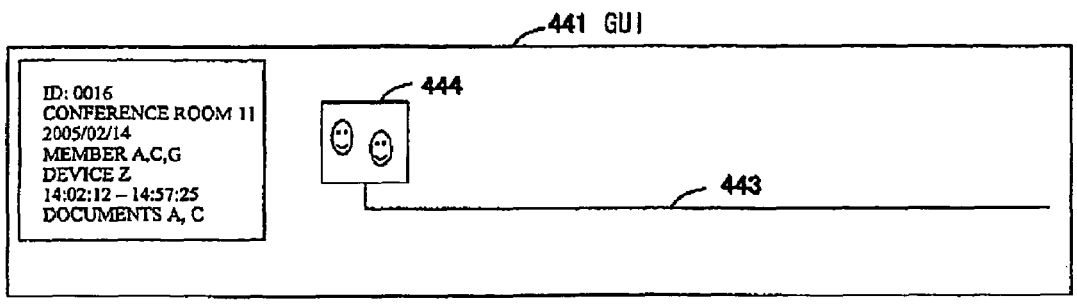

FIG. 9

```
ID: 0017, DATE 20050215, PLACE: 11, MEMBER; A;E;F;G, DEVICE; T, TIME 10:34:00-
11:55:45
ID: 0018, DATE 20050217, PLACE: 12, MEMBER; A;B, DEVICE: Y, TIME 13:51:00-15:12:30
DOCUMENTS: DOCUMENT E, DOCUMENT G
00:00:00 |001:132|002:000|020:000|021:025|000000.JPG;
ID: 0019, DATE 20050218, PLACE: 12, MEMBER; A;C;G;J, DEVICE: Z, TIME 11:06:42-
12:07:43
DOCUMENTS: SLIDE B, DOCUMENT F
IMAGE: VIDEO 0019.mpg
00:00:00 | A:132 | C:066 | G:000 | Z:135;
00:00:01 | A:132 | C:066 | G:056 | Z:135;
00:00:02 | A:032 | C:066 | G:056 | Z:135 | DOCUMENT F;
00:00:03 | A:032 | C:065 | G:056 | Z:135 | DOCUMENT F;
00:00:04 | A:132 | C:065 | G:055 | Z:135 | SLIDE B/AT FIRST
00:00:05 | A:132 | C:065 | G:055 | Z:135 | SLIDE B/AT FIRST
00:00:06 | A:032 | C:065 | G:054 | Z:135 | SLIDE B/ABOUT COST
00:00:07 | A:031 | C:065 | G:044 | Z:135 | SLIDE B/ABOUT COST
      :
00:02:22 | A:031 | C:065 | G:044 | Z:135 | SLIDE B/ABOUT COST
00:02:23 | A:031 | C:065 | G:044 | Z:135 | SLIDE B/FIRST REFORM PLAN
      :
      :
```

FIG. 13

ID: 0020, DATE 20050303, PLACE: 11, MEMBER; A;E;F;G, DEVICE: T, TIME 10:34:00-11:55:45

ID: 0021, DATE 20050303, PLACE: 12, MEMBER; A;B, DEVICE: Y, TIME 13:51:00-16:12:30
DOCUMENTS: DOCUMENT H. doc, DOCUMENT G. ppt ID: 0022, DATE 20050310, PLACE: 12, MEMBER; A;C;G;J, DEVICE: Z, TIME 11:06:42-12:07:43
DOCUMENTS: SLIDE B. ppt, DOCUMENT F. txt, DOCUMENT G. doc
IMAGE: VIDEO 0022.mpg
00:00:00 | A:132 | C:066 | G:000 | Z:135;
00:00:01 | A:132 | C:066 | G:056 | Z:135; DOCUMENT G. doc;
00:00:02 | A:032 | C:065 | G:056 | Z:135 | DOCUMENT G. doc;
00:00:03 | A:032 | C:065 | G:056 | Z:135 | DOCUMENT F. txt;
00:00:04 | A:132 | C:065 | G:055 | Z:135 | SLIDE B. ppt/AT FIRST
00:00:05 | A:132 | C:065 | G:055 | Z:135 | SLIDE B. ppt/AT FIRST
00:00:06 | A:032 | C:065 | G:054 | Z:135 | DOCUMENT F. txt;
00:00:07 | A:031 | C:065 | G:044 | Z:135 | DOCUMENT F. txt;
:
00:02:22 | A:031 | C:065 | G:044 | Z:135 | DOCUMENT F. txt;
00:02:23 | A:031 | C:065 | G:044 | Z:135 | SLIDE B. ppt/AT FIRST;
:
:

FIG. 17

```
ID: 0023, DATE 20050311, PLACE: 11, MEMBER; A;E;F;G, DEVICE: T, TIME 10:34:00-
11:55:45
ID: 0024, DATE 20050311, PLACE: 12, MEMBER; A;B, DEVICE: Y, TIME 13:51:00-15:12:30
DOCUMENTS: DOCUMENT H. doc , DOCUMENT G. ppt
00:00:00|001:132|002:000|020:000|021:025|000000 IRC:
ID: 0025, DATE 20050314, PLACE: 22, MEMBER; A;C, DEVICE: X;S, TIME 11:06:42-12:07:43
DOCUMENTS: SLIDE H. ppt, DOCUMENT J. txt, DOCUMENT K. doc
IMAGE: VIDEO 0025.mpg
00:00:00 | A:132 | C:066 | X:133 | S:135;
00:00:01 | A:132 | C:066 | X:133 | S:135 | SLIDE H. ppt/PURPOSE AND PROBLEM @ PROJECTION SURFACE A
00:00:02 | A:032 | C:065 | X:133 | S:135 | SLIDE H. ppt/PURPOSE AND PROBLEM @ PROJECTION SURFACE A
00:00:03 | A:032 | C:066 | X:133 | S:135 | SLIDE H. ppt/PURPOSE AND PROBLEM @ PROJECTION SURFACE A
00:00:04 | A:132 | C:065 | X:133 | S:135 | SLIDE H. ppt/PURPOSE AND PROBLEM @ PROJECTION SURFACE A
00:00:05 | A:132 | C:065 | X:133 | S:135 | SLIDE H. ppt/PURPOSE AND PROBLEM @ PROJECTION SURFACE A
00:00:06 | A:032 | C:065 | X:133 | S:136 | SLIDE H. ppt/PURPOSE AND PROBLEM @ PROJECTION SURFACE A +
                                            DOCUMENT J. txt @ PROJECTION SURFACE B;
00:00:07 | A:031 | C:065 | X:133 | S:135 | SLIDE H. ppt/PURPOSE AND PROBLEM @ PROJECTION SURFACE A +
                                            DOCUMENT J. txt @ PROJECTION SURFACE B;
:
00:02:22 | A:031 | C:065 | X:133 | S:136 | SLIDE H. ppt/SOLUTION 1 @ PROJECTION SURFACE A +
                                            DOCUMENT J. txt @ PROJECTION SURFACE B;
00:02:23 | A:031 | C:065 | X:133 | S:136 | SLIDE H. ppt/SOLUTION 1 @ PROJECTION SURFACE A;
:
:
00:34:10 | A:031 | C:065 | X: 133 | S:135 | DOCUMENT J. txt @ PROJECTION SURFACE A + DOCUMENT K. doc @ PROJECTION
                                             SURFACE B;
00:34:11 | A:031 | C:065 | X: 133 | S:135 | DOCUMENT J. txt @ PROJECTION SURFACE A + DOCUMENT K. doc @ PROJECTION
                                             SURFACE B;
:
```

INFORMATION PROCESSING SYSTEM AND INFORMATION PROCESSING METHOD

BACKGROUND OF THE INVENTION

1. Field of the Invention

This invention relates to an information processing system and information processing method.

2. Description of the Related Art

Conventionally, a technique for extracting an image has been proposed in consideration objects and people seen in the image and positional relationships between them. Japanese Patent Application Publication No. 2000-125274 (hereinafter, referred to as Document 1) of Picture Tel Corporation and a product named MP-Meister have been proposed as conventional techniques to access the image with a document used as a retrieval key or clue.

Document 1 displays thumbnails of a slide, which had been used in the conference, on positions of times provided on the timeline that shows the elapsed time of the conference, allowing the user to reproduce a moving image or video file in a time slot while the slide was being displayed. As in MP-Meister, the slide used in the conference is captured while the image of the conference is being recorded, and the slide is stored together with the time when the slide was displayed. This allows the user to select one from a list of the thumbnails of the slides that have been used in a conference and reproduce the moving image or video in the time slot while the slide was being displayed.

In the same manner, Japanese Patent Application Publication No. 10-55391 (hereinafter, referred to as Document 2) describes a technique, by which the slide operation in the presentation is linked with the image in which the presentation is captured, so that the slide can be displayed in synchronization with the image reproduction or the synchronized image can be viewed by selecting the slide.

With the above-mentioned conventional techniques, however, it is possible to select the slide to view the image in synchronization with the slide. Nevertheless, the conference has to be specified, first. It is convenient to employ the above-mentioned conventional techniques, if the user has already determined in advance what on the conference the user like to view. However, for example, if the user likes to view the image relating to when the user delivered a presentation with the document stored on the user's personal computer, it is necessary to specify the conference. That is to say, the above-mentioned conventional techniques cannot meet the requirement that the user likes to view the slide or document in hand that has been displayed in the conference, although the user does not know in what conference the slide or document was used.

Additionally, as described heretofore, it is impossible to search the related image with the positional relationships of the objects and people on the real scene that are not included in the images, even with the use of the technique that extracts the similar image in consideration of objects and people seen in the image and positional relationships between them. To overcome the afore-described drawback, Japanese Patent Application Publication No. 2005-234722 (hereinafter, referred to as Document 3) describes a technique that searches the related image by the positional relationship of the objects and people on the real scene that are not included in the images. It is to be noted that, in the search technique described in Document 3, the image retrieval method is not completely carried out by using the positional relationships of the objects and people in a real space. For example, the document used in the conference as an object is not utilized as a retrieval key or clue.

SUMMARY OF THE INVENTION

The present invention has been made in view of the above circumstances and provides an information processing system and information processing method. An image can be searched by using a document that was used in a space as a search keyword, with the information processing system and information processing method.

According to one aspect of the present invention, there is provided an information processing system including: a memory portion that stores image information of a space in association with a document, the image information being captured by an image capturing portion, the document being used while the space being captured, a receiving portion that receives information that specifies the document as a search request; and a search portion that searches the image information stored on the memory portion for a scene associated with the document specified by the search request, on the basis of the search request. According to the present invention, the image information of the space is managed in association with the document that was used while the image information was being captured, enabling the image to be searched with document used in the space as a keyword or clue.

According to another aspect of the present invention, there is provided an information processing system including: an image capturing portion that captures a space; a recognition portion that recognizes a document that is used while the space is being captured; and an applying portion that applies information on the document recognized by the recognition portion to image information captured by the image capturing portion, as a search index. This enables to search the scene that the user likes to view later by using the document information.

According to a further aspect of the present invention, there is provided an information processing method including: receiving information that specifies a document as a search request; searching image information stored in a memory portion for a scene associated with the document on the basis of the search request, the image information being captured by an image capturing portion and being stored in the memory portion in association with the document used while a space is being captured; and displaying information of the scene that has been searched.

BRIEF DESCRIPTION OF THE DRAWINGS

Embodiments of the present invention will be described in detail based on the following figures, wherein:

FIG. 2 is a view showing an example of data stored in a conference DB 30 in accordance with a first embodiment of the present invention;

FIG. 8 is a view showing a GUI displayed by the search result display portion in accordance with the first embodiment of the present invention;

FIG. 9 is a view showing an example of a data structure of the conference DB in accordance with a second embodiment of the present invention;

FIG. 13 is a view showing a data structure of the conference DB in accordance with the third embodiment of the present invention;

FIG. 17 is a view showing an example of a data structure of the conference DB in accordance with the fourth embodiment of the present invention;

DESCRIPTION OF THE EMBODIMENTS

Figure 1:
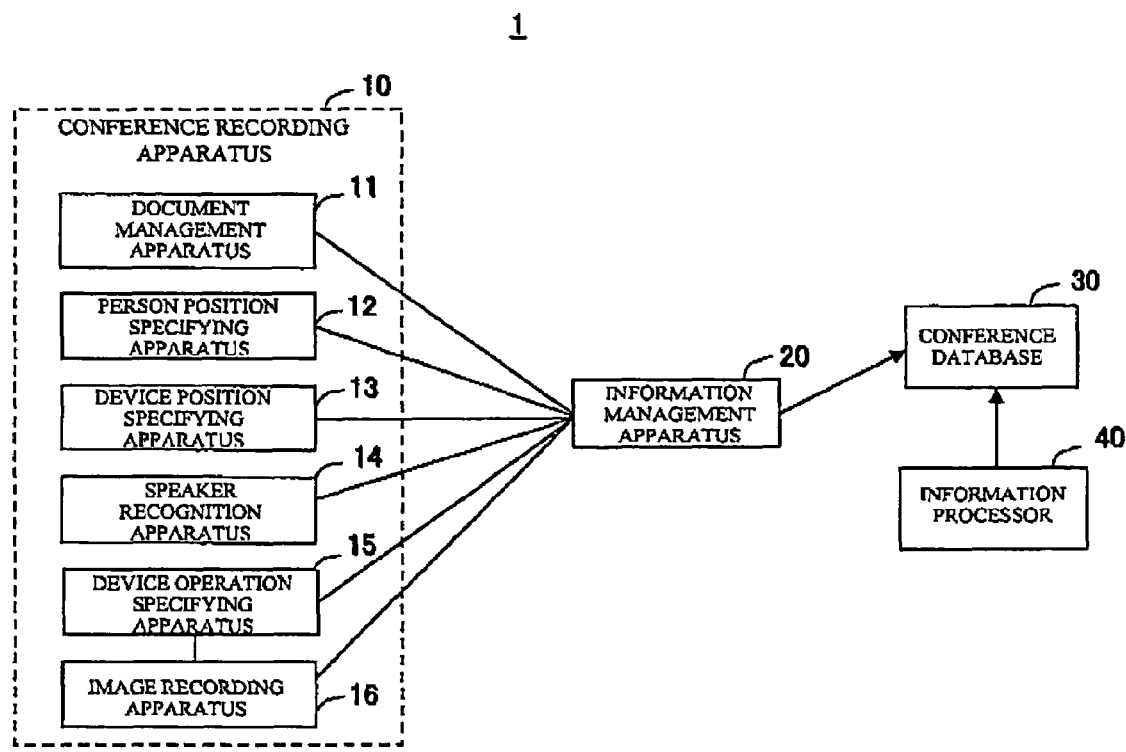
FIG. 1 is a view showing a whole configuration of an information system in accordance with the present invention.

A description will now be given, with reference to the accompanying drawings, of embodiments of the present invention. FIG. 1 is a view showing a whole configuration of an information system in accordance with the present invention. An information system 1 includes a conference recording apparatus 10, an information management apparatus 20, a conference database (DB) 30, and an information processor 40. The information management apparatus 20 manages conference information recorded in the conference recording apparatus 10. The conference database (DB) 30 serves as a memory portion. In a description hereafter, an object includes one or more persons, one or more devices or apparatuses, and facilities. A conference room will be exemplified as a space.

The information processing system 1 includes capabilities of searching a conference image by use of a document that was used in the conference, as a new technique of searching the conference image. Specifically, the information processing system 1 is capable of searching a scene with the document that was used in the scene. Here, documents are added to search keywords or clues, in addition to conference rooms, positions of participants or objects, remarks of the participants, orders of remarks, the devices that were used. A document that was used in the conference was recorded together with a position or remarks of a person. It is therefore possible to search the image by inputting a document into the system as a retrieval key, if the user likes to search the scene when a participant of the conference used the document.

The conference recording apparatus 10 records the conference information, and includes a document management apparatus 11, a person position specifying apparatus 12, a device position specifying apparatus 13, a speaker recognition apparatus 14, a device operation specifying apparatus 15, and an image recording apparatus 16. The document management apparatus 11 serves as a recognition portion. The image recording apparatus 16 serves as an image capturing portion. The conference recording apparatus 10 is provided for every conference room. A conference room ID is assigned to each conference recording apparatus 10 provided in each conference room.

The document management apparatus 11 manages the document used in each conference, and has capabilities of recognizing the document used while the space is being captured. The document management apparatus 11 is composed of hardware or software that captures the image of the document being projected by a projector, for example, and a projection period, software that records a file name of the slide document being projected on the screen and a title of each page together with the time, or software that records URL (Uniform Resource Locator) that was accessed together with the time. For example, the document management apparatus 11 is composed of, for example, software that monitors the slide being displayed on the personal computer coupled to the projector or software that monitors open and close of the document file.

The person position specifying apparatus 12 specifies the position of each participant in the conference room. The person position specifying apparatus 12 includes an IC tag (RFID tag) that records a person's ID and a reader that reads the person's ID in the IC tag. Each person has an ID card into which the IC tag is embedded. The IC tag records the person's ID that can specify an individual. Multiple readers are installed on a floor or sidewall of the conference room to read the person's ID. For example, a reader is installed in the center of lattice-shaped segments on the floor of the conference room. The reader reads the person's ID and a remark flag at certain intervals and sends such read information to the information management apparatus 20. The reader may be installed on a desk as a position recognition method. The reader is capable of recognizing the position on which the person who is sitting around the desk and the direction that the person faces by installing one or more readers on the positions that face respective seats. The positional information of the person maybe obtained automatically, by utilizing the position estimate technique with an ultrasonic sensor or the sound source estimate technique with microphone array on the person position specifying apparatus 12.

The device position specifying apparatus 13 specifies and stores the positions of the devices and facilities such as a table or whiteboard in the conference room. The device position specifying apparatus 13 operates in the same manner as that of the person position specifying apparatus 12. The devices and facilities include, for example, a movable whiteboard, chair, desk, screen, display, printer, speaker and any other thing provided in the conference room. The speaker recognition apparatus 14 recognizes and stores a speaker in the conference. The speaker recognition apparatus 14 has a circuit that turns on a remark flag that shows there is a remark stronger than a certain strength, operating with, for example, a small-sized microphone and a writing device in the ID card carried by each person, and then transmits a person's ID, reader's ID, and the remark flag to the information management apparatus 20. The speaker recognition apparatus 14 may be realized by utilizing the sound recognition technique. The device operation specifying apparatus 15 monitors an operation state of the device such as a projector or light provided in the conference room, and sends any change in the operation state to the information management apparatus 20. The image recording apparatus 16 is composed of, for example, a camcorder, and transmits the moving image being recorded to the information management apparatus 20.

The information management apparatus 20 has capabilities of applying the information on the document recognized by the document management apparatus 11 to image information captured by the image recording apparatus 16 as a search index. That is to say, the information management apparatus 20 stores the image information of a space captured by the image recording apparatus 16 in the conference DB 30 in association with the document that was used when the space was captured. In addition, the information management apparatus 20 applies the information on each page of the slide, if the document is a slide, to each scene of the image as a search index. Further, the information management apparatus 20 applies the information on the title of each page of the slide, if the document is a slide, to each scene of the image as a search index.

The information management apparatus 20 inquires the conference DB 30, obtains a new conference ID, and internally stores a pair of the conference ID and the conference room (the conference ID list). Then, the information management apparatus 20 creates a new record in the conference DB 30, and stores the conference ID, name of the conference room, date, and time therein. At this time, the information management apparatus 20 sends to and stores a starting date and a starting time. The user gives an instruction on an end of the conference to the conference recording apparatus 10, when the user finishes recording. The conference recording apparatus 10 sends the conference name and also sends that the conference has been finished to the information management apparatus 20. The information management apparatus 20 acquires a corresponding conference ID from the conference ID list, and records an end time and a period of the conference. The information management apparatus 20 deletes the corresponding conference room name and the conference ID from the conference ID list. The information management apparatus 20 refers to the ID list, searches the conference room name for the conference ID, and stores the video image on a record that corresponds to the conference ID that has been searched.

In processing on the person position specifying apparatus 12 and the speaker recognition apparatus 14, while the conference is being recorded, the remark of the person who carries the ID card is detected by the microphone embedded in the ID card. When the person position specifying apparatus 12 detects the person's remark, the speaker recognition apparatus 14 turns on the remark flag of a wireless IC tag buried in the ID card. The person position specifying apparatus 12 is turned off when the remarks are not detected. The persons' IDs are recorded in the wireless IC tag to specify the person to be read by the reader. Here, a wireless method specified in ISO5693 is employed. The reader sends the person's ID, the remark flag, the reader ID of the reader, and the conference room name in which the reader is installed, to the information management apparatus 20. The information management apparatus 20 acquires the name of the person with a person's ID conversion list, and obtains the conference ID using the conference ID list. The information management apparatus 20 sends the information to the conference DB 30. Here, the reader reads the information every second.

The device position specifying apparatus 13 is capable of using the same method as that of the person position specifying apparatus 12 by applying the wireless IC tag, to the devices and facilities to which IDs are given. Therefore, a description is omitted here. The device operation specifying apparatus 15 monitors on and off of the power of the projector and light while the conference is being recorded. The device operation specifying apparatus 15, if there is a change in the state of on and off, transmits the name of the device, the state of the device subsequent to the change, and the conference room name, to the information management apparatus 20. The information management apparatus 20 searches the conference ID list for the conference name, obtains the conference ID to record the conference ID, device ID, device state, and time. The information management apparatus 20 receives the moving image, the person's ID and the remark flag read by each reader, the reader's ID, and the operation state of the device to store in the conference DB 30. At this time, the information transmitted from the start to end of the conference recording apparatus 10 is stored as one record.

FIG. 2 is a view showing an example of data stored in the conference DB 30 in accordance with a first embodiment of the present invention. Data as shown in FIG. 2 is stored in the conference DB 30. The conference DB 30 stores the image information in which a space is captured by the image recording apparatus 16 in association with the document, which were used while the space was being captured, or attribute information. It is possible to search the image to be viewed with the information of the document or the attribute information used as a retrieval key. Here, one record is prepared for one conference, and the conference ID, date, place, member, device, time are recorded in the first line of the record to identify each conference. In the second line, the document name that was used in the conference is listed as document information. An image field includes a linked page that stores the video image of the conference as image information. The operation state is recorded in every scene of the image in the rest of the record. In the operation state, the elapsed times of the conference are recorded every second in association with the position and the remark state of the participant together with the position and the operation state of the device, as the attribute information. For example,

00:00:01|A:132|C:000|G:056|Z:035;

denotes that a participant A made remarks (shown by 1) one second after the conference started, and is located on a position of 3 in X-axis direction and 2 in Y-axis direction, when the room is segmented into rectangular blocks having a given size. It is shown that a participant C has not participated in the conference yet. A participant G has not made remarks yet (shown by 0), and is located on a position of 5 in X-axis direction and 6 in Y-axis direction. A device Z is turned off (shown by 0), and is located on a position of 3 in X-axis direction and 5 in Y-axis direction. The document information or the attribute information to be stored on the conference DB 30 can be input manually.

Figure 3:
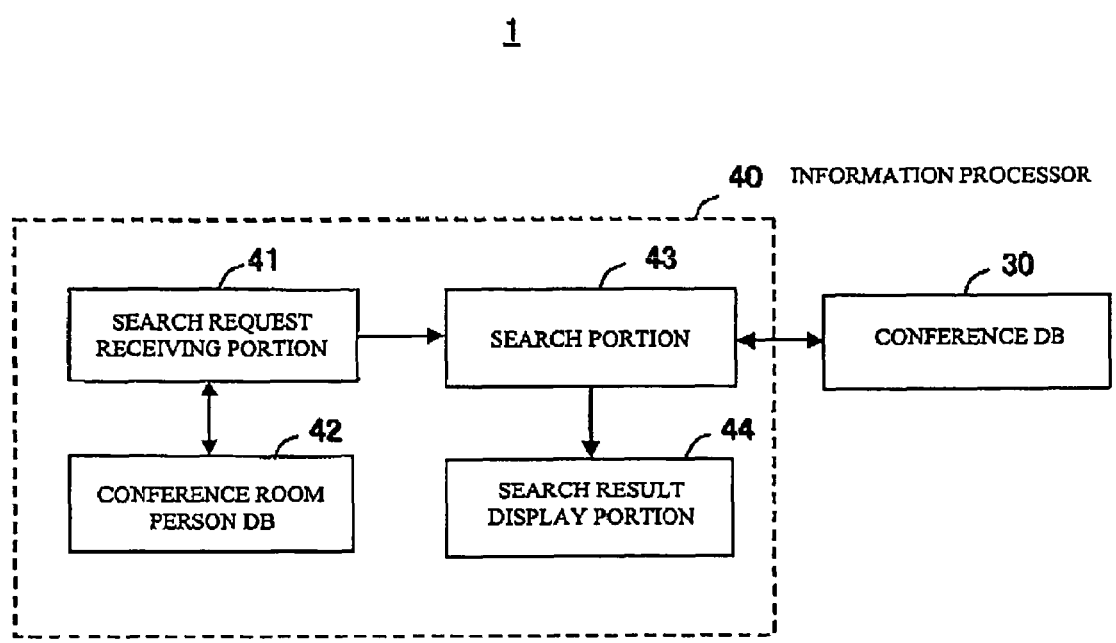
FIG. 3 is a view showing a configuration of the information processor in accordance with the first embodiment of the present invention.

FIG. 3 is a view showing a configuration of the information processor in accordance with the first embodiment of the present invention. The information processor 40 includes a search request receiving portion 41, a conference room person DB 42, a search portion 43, and a search result display portion 44. The search request receiving portion 41 receives a search request according to the operation on GUI (Graphical User Interface) that serves as a retrieval screen. For example, the search request receiving portion 41 receives the information that indicates the document that was being used while the space was being captured according to the operation on GUI and the attribute information, as a search request.

The conference room person DB 42 retains the information on the conference rooms and the participants. The conference room person DB 42 stores the names of the persons that can be the participants, IDs, photographs of persons' faces, and layout charts of the conference rooms, and is reflected onto GUI of the search request receiving portion 41, as will be described hereafter. The information on the conference room person DB 42 may be input manually For example, when a new employee is assigned, the user stores the name, ID, and photograph thereof on the conference room person DB 42. When a conference room is newly set up, the user registers the name of the room and the layout chart thereof in the conference room person DB 42. The search portion 43 searches the conference DB 30 on the basis of the search request from the search request receiving portion 41. For example, the search portion 43 searches for the image information in the conference DB 30 for the scene associated with the document specified by the search request, on the basis of the search request. The search result display portion 44 displays a search result obtained from the search portion 43 on the display device. For example, the search result display portion 44 displays the information, on the searched scene on the display device as the search result.

Figure 4:
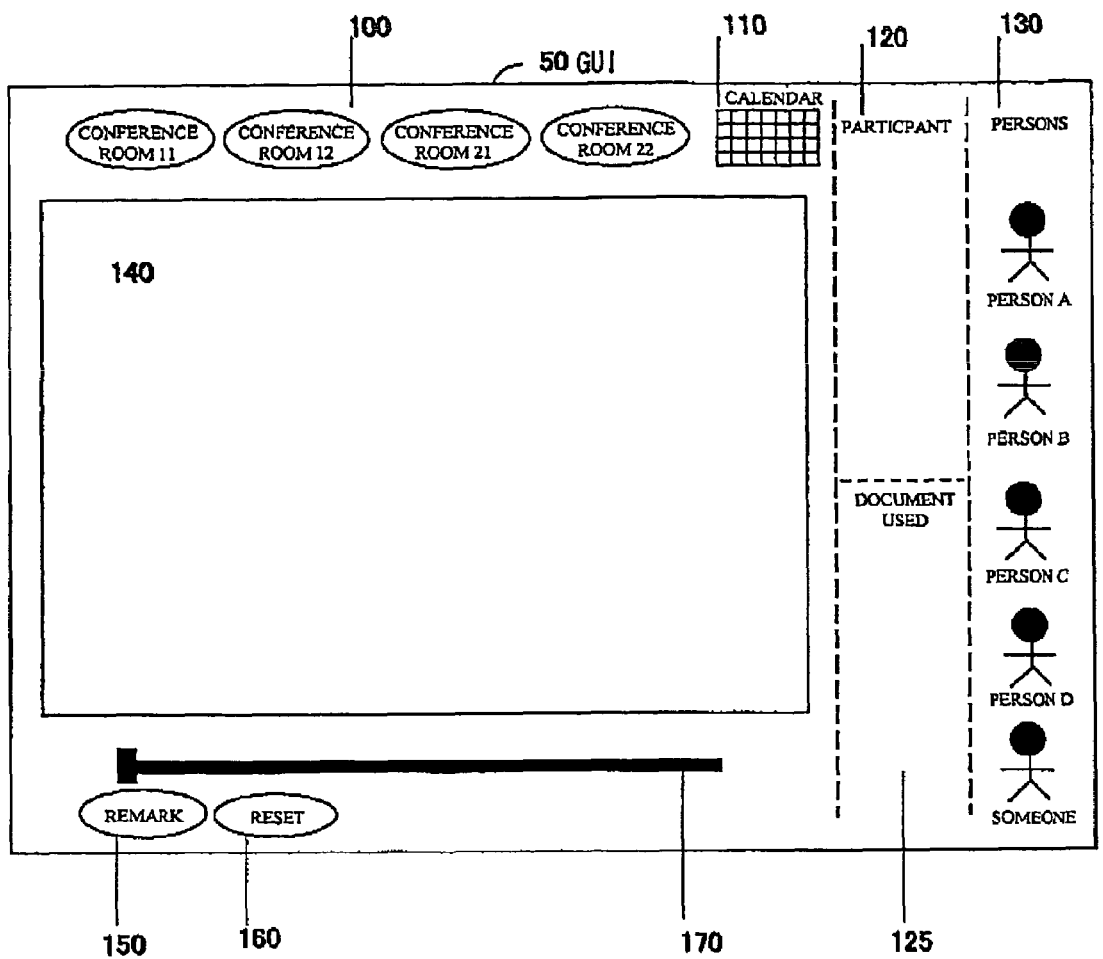
FIG. 4 is a view showing a GUI displayed by a search request receiving portion in accordance with the first embodiment of the present invention.

FIG. 4 is a view showing a GUI displayed by the search request receiving portion 41 in accordance with the first embodiment of the present invention. The search request receiving portion 41 includes a GUT 50 as shown in FIG. 4. The search request receiving portion 41 shows, on the GUI 50, a group of buttons 100, a calendar 110, a participant area 120, a document area 125, a person area 130, a conference room display area 140, a remark button 150, a reset button 160, and a time scroll bar 170. The buttons 100 are provided for selecting the conference room to select the space. The calendar 110 is provided for selecting the time when the conference was carried out to select the captured date of the image. The participant area 120 is provided for specifying the participant as the area for specifying the person in the space. The document area 125 is provided for specifying the document as the area for indicating the document. The person area 130 displays icons that show persons. The conference room display area 140 is provided for displaying the layout chart of the conference room when one of the buttons 100 is selected. The remark button 150 is provided for specifying the remark state of the person. The reset button 160 is provided for returning the GUI to an initial state. The time scroll bar 170 is provided for specifying the elapsed time of the conference.

The layouts of the conference rooms may be formed into the thumbnails to be used for the buttons 100. This makes it possible to select the room with reference to not only the room name but also the layout thereof. The person area 130 displays person icons A through D that represent the individuals. The photographs of the persons' faces may be displayed on the icons A through D. The names of the individuals are given below the persons' icons A through D. The person's icon having the name of "someone" is an icon that does not specify a particular person. When the user manipulates the person's icon on the GUI 50, the search request receiving portion 41 issues the manipulation as a search query.

Figure 5:
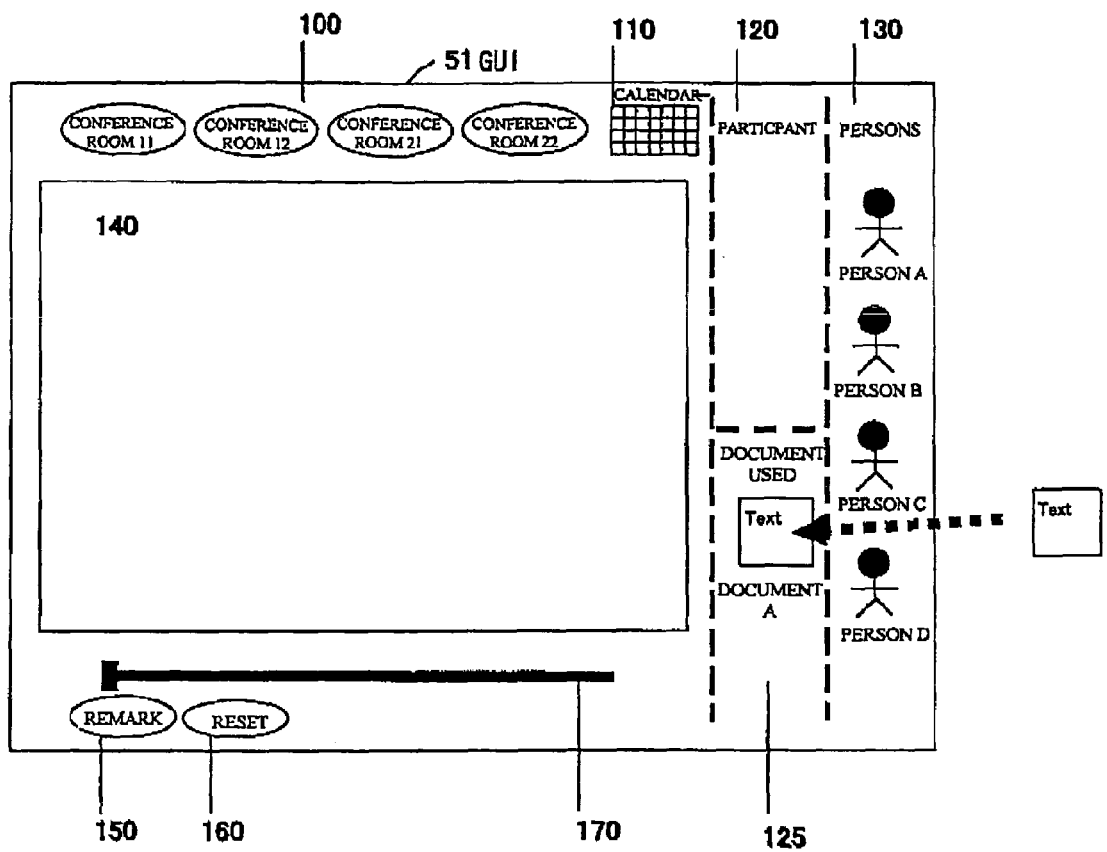
FIG. 5 is a view showing a GUI displayed by the search request receiving portion in accordance with the first embodiment of the present invention.
Figure 6:
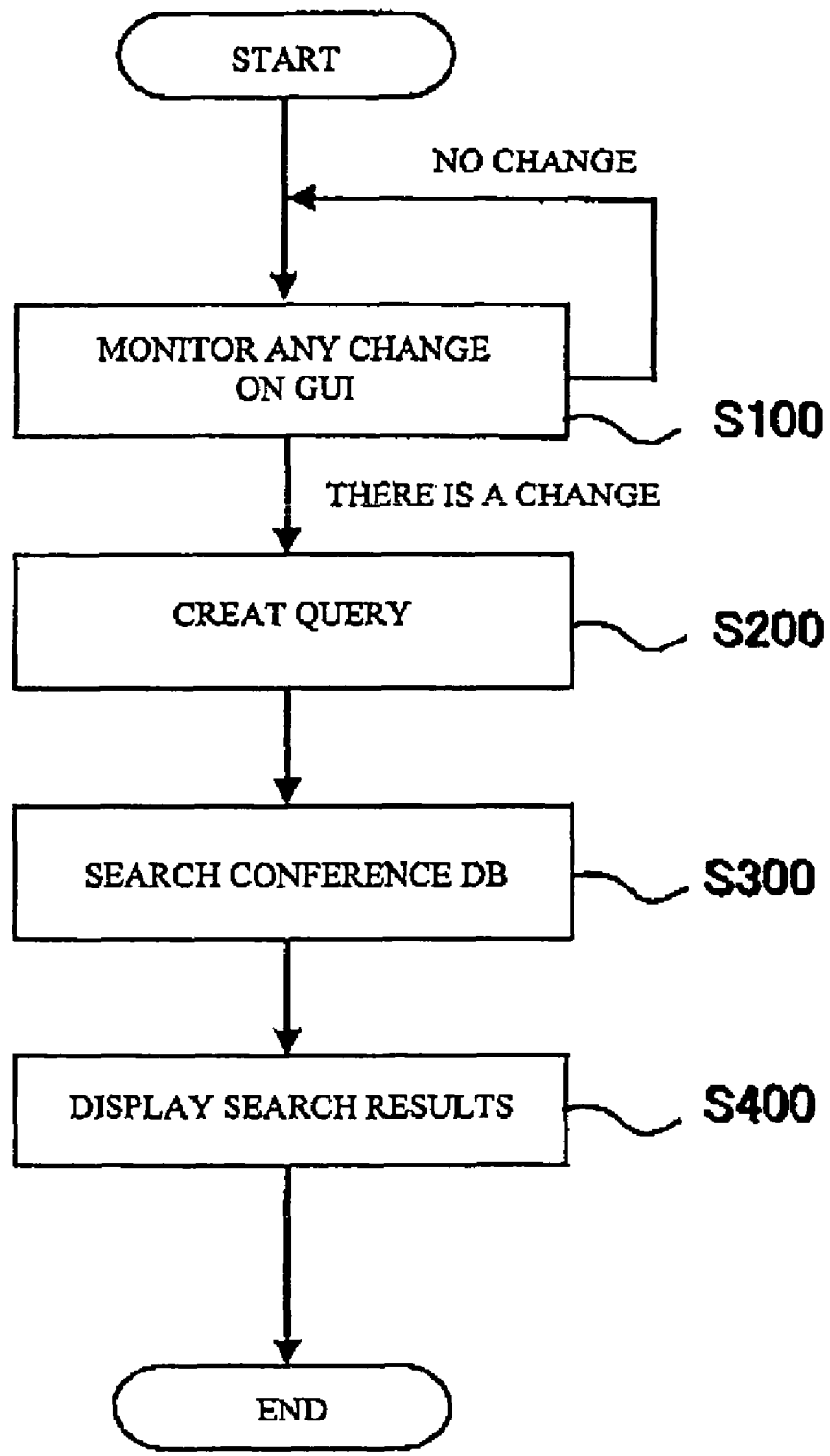
FIG. 6 is a flowchart showing a whole process of an information processor in accordance with the first embodiment of the present invention.
Figure 7:
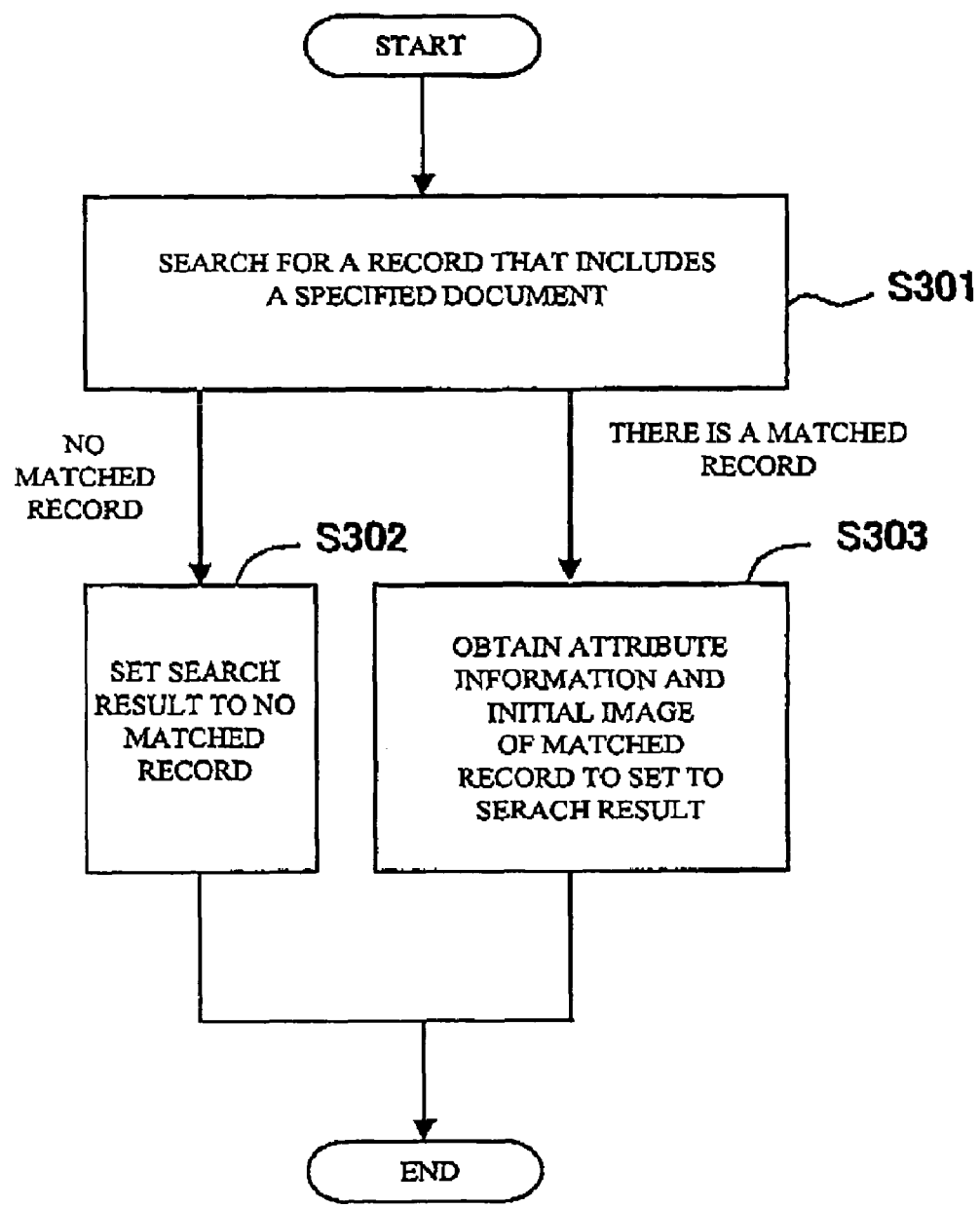
FIG. 7 is a flowchart showing a process of a search portion in accordance with the first embodiment of the present invention.

A description will be given of a search procedure on the information processor. FIG. 5 is a view showing a GUI 51 provided by the search request receiving portion 41 in accordance with the first embodiment of the present invention. FIG. 6 is a flowchart showing a whole process of the information processor 40 in accordance with the first embodiment of the present invention. FIG. 7 is a flowchart showing a process of the search portion 43 in accordance with the first embodiment of the present invention. FIG. 5 exemplifies that the search request receiving portion 41 receives the information that specifies the document as a search request in a format where the icon of the text document is provided in a given area to show the file content of the document. Assuming that there is an icon of the text document on the desktop of the user's personal computer and the user likes to watch the conference image in which the text document was used. As shown in FIG. 5, the user drags and drops the icon from the desktop to the document area 125 on the GUI 51. The search request receiving portion 41 monitors a change in the GUI 51 (step S100 in FIG. 6), and if there is a change on the GUI 51, the search request receiving portion 41 reads the arrangement of the icons on the GUI 51 and issues a query (step S200 in FIG. 6). In the afore-mentioned example, the search request receiving portion 41 obtains a file name of a "document A" stored in the used document area 125, and issues a following search request.

Search query: Document: Document A

The search portion 43 searches the conference DB 30 on the basis of the search request received from the search request receiving portion 41 (step S300 in FIG. 6). The search portion 43 searches for the record that includes the specified document (step S301 in FIG. 7). The search portion 43 sets the search result as no matched record, if there is no matched record (step S302 in FIG. 7). The search portion 43 goes to step S303, if there is a matched record. Here, the search portion 43 searches for a record that includes the document A in the document field of each conference record. The record of a conference ID 0016 is searched in an example shown in FIG. 2. Then, the search portion 43 obtains the first line of the record that has been searched, the file name of the video image listed in the image field, and an initial image thereof (step S303 in FIG. 7), and sends to the search result display portion 44.

FIG. 8 is a view showing a GUI displayed by the search result display portion 44 in accordance with the first embodiment of the present invention. There is only one matched conference, and the information on the afore-mentioned one conference is shown as an example in FIG. B. The search result display portion 44 receives the conference ID, date, place, participant, device, time, and document name, and then displays a GUI 441 for every conference to the user as shown in FIG. 8 (step S400 in FIG. 6). The search result display portion 44 displays a timeline 443 for each conference. The initial image is formed into a thumbnail 444, and the thumbnail 444 is displayed on a left edge of the timeline 443.

When the user clicks the thumbnail 444, the search result display portion 44 requests the search portion 43 for the video image of the corresponding ID. The search portion 43 returns the linked page of the video image listed on the record of the corresponding conference ID. The search result display portion 44 launches a video player, and reproduces the moving image stored in the linked page, which has been obtained. The procedure described heretofore allows the user to view the image of the conference in which the document A was used.

A description will be given of a second embodiment of the present invention. The second embodiment will exemplify a case where a scene is searched with the use of the document, URL, slide, page of the slide, and time when they were viewed. The second embodiment partially has the same components with those of the first embodiment, and FIG. 3 and FIG. 6 will also be referred to in the description hereafter.

FIG. 9 is a view showing an example of a data structure of the conference DB 30 in accordance with the second embodiment of the present invention. The data structure of the conference DB 30 in accordance with the present embodiment is different from the conference DB 30 described in the first embodiment in that the file name and title of the slide, which were referred to at each time during the conference, are newly added to the conference DB 30 in accordance with the second embodiment of the present invention. That is to say, the conference DB 30 in accordance with the first embodiment stores the document information in association with the respective images. However, the conference DB 30 in accordance with the second embodiment of the present invention stores the document information in association with the respective scenes of the image information. In addition, the conference DB 30 in accordance with the second embodiment of the present invention stores the information on each page of a slide in association with each scene of the image, if the document is a slide. Furthermore, the conference DB 30 stores the information on the title of each page of a slide in association with each scene of the image, if the document is a slide.

The image information may be associated by manually extracting and the file name and the title to input them manually in a time slot while the page is being displayed. If the image information is automatically extracted, the document management apparatus 11 obtains a timing when the slide changes, and extracts the title of the slide in every time when the slide is changed. If the Web is viewed, the document management apparatus 11 may obtain and input the URL of the Web being displayed, in every time when the URL of the Web is transited or changed. The information management apparatus 20 regards that the slide or URL is referred to until they are changed, and stores the document name, title of the slide, and URL in the time slot of the matched record in the conference DB 30. If the text file that does not have a concept of the page is referred to, only the file name may be recorded in association with the time when the file is opened.

The user, as described above, drags and drops the icon showing the document on the desktop or the like, and specifies the document or icon as the retrieval key by dragging and dropping the area in which the URL of the Web browser is described. The scene of the conference in which the slide was used is searched by using a slide format being opened on the user's personal computer, for example, by a sheet of slide of Microsoft Power Point. Here, as an example, the user displays a list of slides with a slide listing function, which is a representational function of Power Point. A sheet of slide is dragged and dropped onto the document area 125 shown as GUI in the present system.

The search request receiving portion 41 monitors a change on GUI (step S100 in FIG. 6). If there is a change in GUI, the icon arrangement on the GUI is read and a query is issued (step S200 in FIG. 6). In this example, the search request receiving portion 41 obtains the file name and title of the slide stored in the used document area and the search request is issued as follows.

Search query: Document: Document B/about cost

Subsequently, the search portion 43 receives the search request and searches the conference DB 30 (step S300 in FIG. 6).

Figure 10:
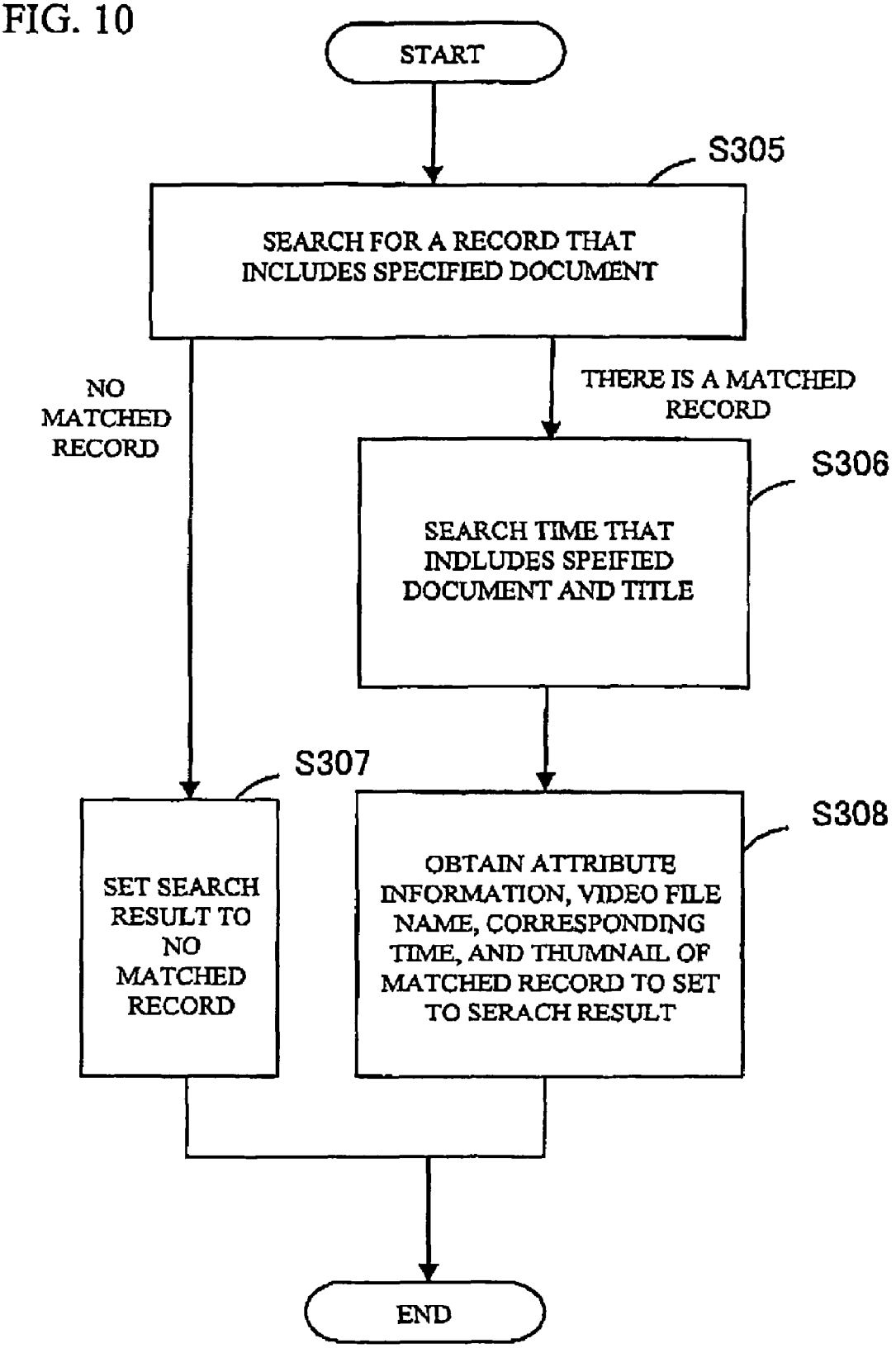
FIG. 10 is a flowchart showing the process in the search portion in accordance with the second embodiment of the present invention.

FIG. 10 is a flowchart showing the process in the search portion 43 in accordance with the second embodiment of the present invention. The search portion 43 searches a record that includes the specified document (step S305 in FIG. 10). Here, the search portion 43 searches the conference record that includes the slide B, which is the document name. The search portion 4 3 sets the search result to no matched record, if there is no matched record (step S307). If there is a matched record, processing goes to step S306. In FIG. 9, the record of a conference ID 0019 is searched.

Next, the search portion 43 searches the specified document and the time that includes the title, if there is a matched record (step S306 in FIG. 10). Here, the search portion 43 searches for a line that includes the document name of "slide B" and the title of "about cost" in the operation field provided for every second of the searched record (step S306 in FIG. 10). In FIG. 9, assuming that the lines from 6 seconds to 2 minutes 22 seconds are also recorded in the operation field, and those from 34 minutes 54 seconds to 36 minutes 04 seconds, not shown in FIG. 9, are also recorded.

The search portion 43 acquires the attribute information of the matched record, the video file name, the corresponding time, and the thumbnail of the matched record (step S308 in FIG. 10), and sets them to the search result. Here, the search portion 43 obtains the first line of the matched record, the file name of the video image listed in the image field, and the corresponding time slot, in this case, from 6 seconds to 2 minutes 22 seconds and from 34 minutes 54 seconds to 36 minutes 04 seconds, and the thumbnails of the earliest times in the corresponding time slots, in this case, the thumbnails of 6 seconds and 34 minutes 54 seconds, to transmit to the search result display portion 44.

Figure 11:
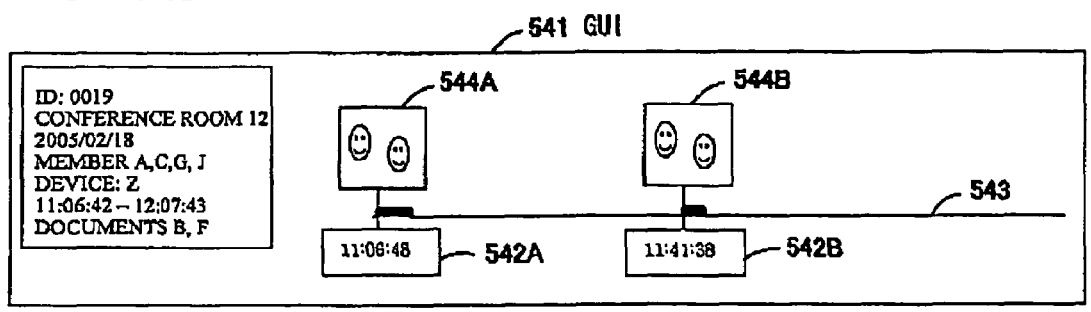
FIG. 11 is a view showing a GUI displayed by the search result display portion in accordance with the second embodiment of the present invention.

FIG. 11 is a view showing a GUI 541 displayed by the search result display portion 44 in accordance with the second embodiment of the present invention. FIG. 11 is an example in which the search result display portion 44 that serves as a display portion displays the thumbnail in association with the timeline. The thumbnail is a downsized image of the scene searched by the search portion 43. The search result display portion 44 receives the conference ID, date, place, participant, device, time, and document name, and then classifies them into groups for the respective conferences to provide the GUI 541 to the user, as shown in FIG. 11 (step S400 in FIG. 6). The search result display portion 44 displays a timeline 543 for each conference, and creates the thumbnail of the initial image to display thumbnails 544A and 544B on corresponding time positions of the timeline 543. At this time, the search result display portion 44 displays a thick line on the timeline 543. The thick line has a length equal to the period while the matched slide was being displayed.

The search result display portion 44 detects that the user clicked the thumbnails 544A and 544B, requests the conference DB 30 for the matched video image, and opens a window for video reproduction and reproduces from the initial image As described above, a sheet of slide allows the user to access the video image or a portion thereof.

Now, a description will be given of a third embodiment of the present invention. The third embodiment will exemplify a case where a type of document is specified to search the scene. The third embodiment partially has the same components with those of the first embodiment, and FIG. 3 and FIG. 6 will also be referred to in the description hereafter.

FIG. 13 is a view showing a data structure of the conference DB 30 in accordance with the third embodiment of the present invention. The conference DB 30 having the structure shown in FIG. 13 is different from those of the conference DB 30 shown in FIG. 2 and FIG. 9 in that file extensions are added to the files that were referred to in each time on the conference. These file extensions may be input into the time slot while the page was being displayed, after the file name and the title are manually extracted. If the Web is viewed, the document management apparatus 11 may obtain and input the URL of the Web being displayed, in every time when the URL of the Web is transited or changed. The information management apparatus 20 regards that the slide or URL is referred to until they are changed, and stores the document name, title of the slide, and URL in the corresponding time slot in the record of the conference DB 30. If the text file that does not have a concept of the page is referred to, only the file name may be recorded in association with the period while the file is being opened.

Figure 12:
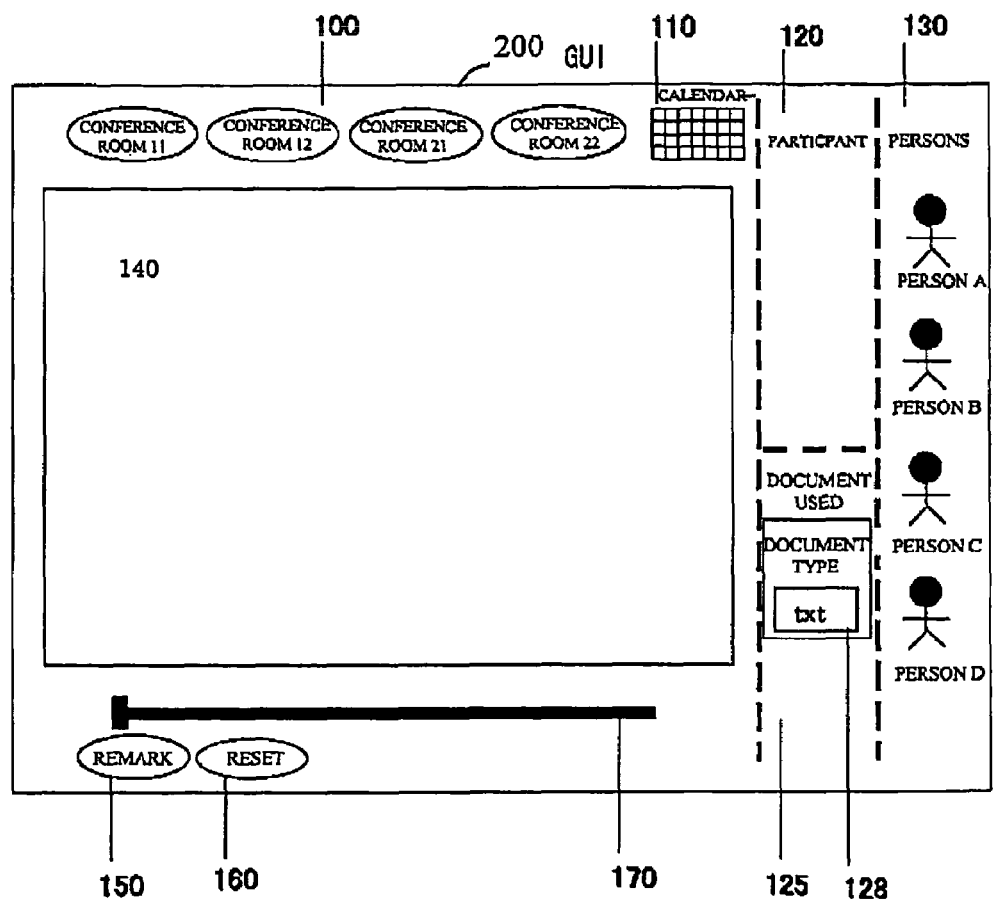
FIG. 12 is a view showing a GUI displayed by the search request receiving portion in accordance with a third embodiment of the present invention.

FIG. 12 is a view showing a GUI 200 displayed by the search request receiving portion 41 in accordance with the third embodiment of the present invention. FIG. 12 is an example of a case where the search request receiving portion 41 receives the document type in a format of a of document, as the information that specifies the document. Here, the document type is identified with the file extension applied to the file. If there is no document that serves as a retrieval key on the user's personal computer, or it the user cannot remember the document name but remembers the document type, the document type can be used for search. First, an instruction is given to specify the document type. For example, the instruction is realized by right-clicking the mouse on the document area 125.

The search request receiving portion 41 generates a document type icon 128 and displays it on the document area 125, after receiving the above-mentioned instruction. The document type icon 128 has an area to specify the document type and the user inputs the file extension in the area as the document type. In this example, "txt" is input. The search request receiving portion 41 monitors any change on the GUI 200 (step S100 in FIG. 6). If there is a change on the GUI 200, the search request receiving portion 41 reads the arrangement of the icons on the GUI 200 and issues a query (step S200 in FIG. 6). In this example, the search request receiving portion 41 acquires the file name of the document stored in the used document area and issues a search request as follows.

Search query: Document type: *.txt

As the document type, there are txt that represents a text document, ppt, doc, and xls, that respectively represent Power Point, Word, and Excel of Microsoft, html and htm that correspond to the document of the Web. The search portion 43 searches the conference DB 30 on the basis of the search request that has been received from the search request receiving portion 41 (step S300 in FIG. 6).

Figure 14:
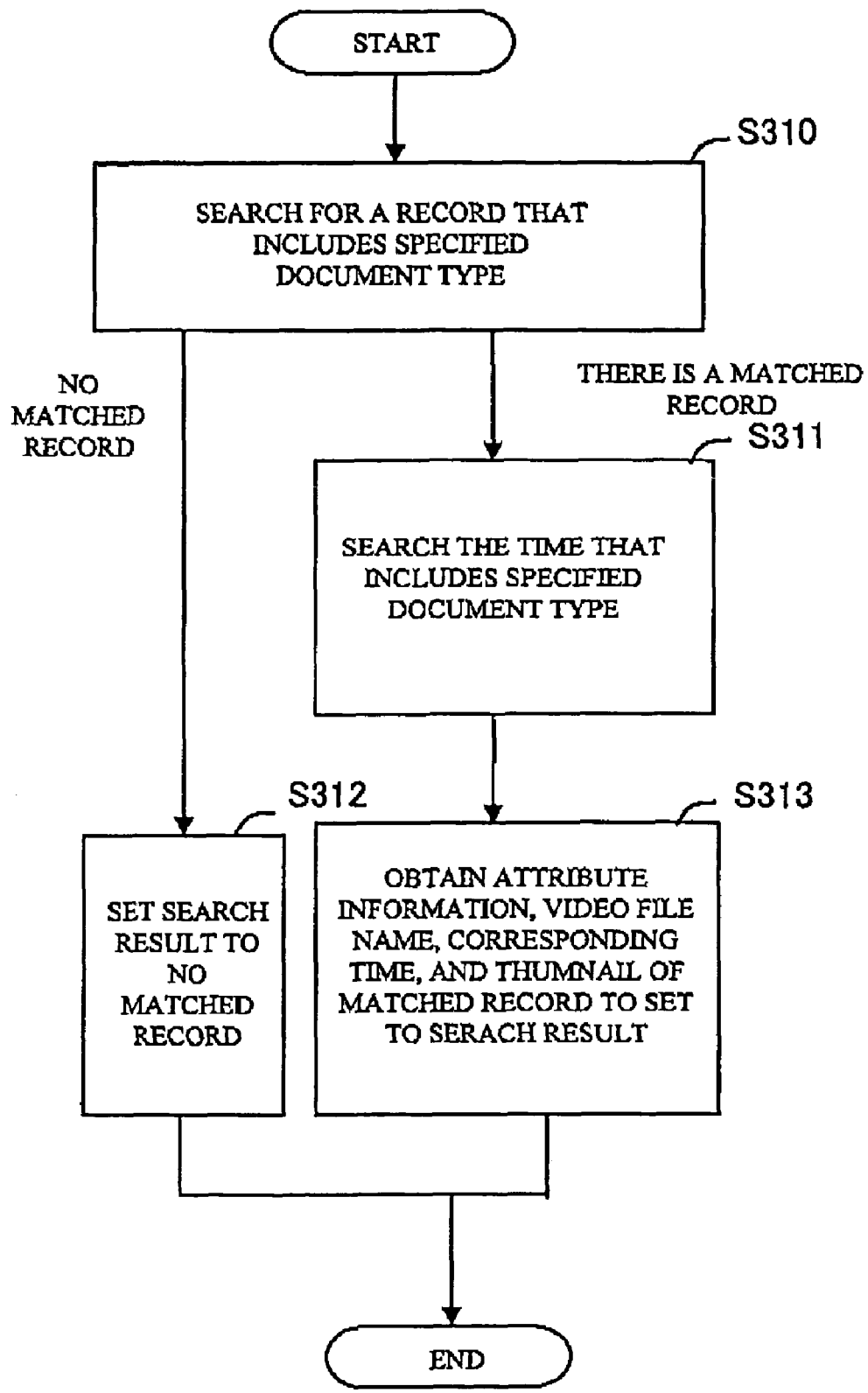
FIG. 14 is a flowchart of the process of the search portion in accordance with the third embodiment of the present invention.

FIG. 14 is a flowchart of the process of the search portion 43 in accordance with the third embodiment of the present invention. The search portion 43 searches the record that includes the specified document type (step S310 in FIG. 14). The search portion 43 sets the search result to no matched record, if there is no matched record (step S312 in FIG. 14). Here, the search portion 43 searches for the conference record that includes the document having the document type of txt. In this case, the search portion 43 may search the documents in the document field of each record for a document that terminates ".txt". In FIG. 13, the record of a conference ID 0022 is searched.

The search portion 43 searches the time that includes the specified document type, if there is a matched record (step S311 in FIG. 14). Here, the search portion 43 searches for the line that has the document type of txt in the operation field provided for every second in the record that has been searched. Also in this case, the search portion 43 may search the document that terminates with ".txt". In FIG. 13, assuming that the lines from 6 seconds to 2 minutes 22 seconds are displayed. The search portion 43 obtains the attribute information, video file name, the corresponding time, and the thumbnail thereof of the matched record, and sets them to the search result (step S313 in FIG. 14). At this time, the search portion 43 acquires the first line of the record, the file name of the video image, the corresponding time slot, in this case, the lines from 6 seconds to 2 minutes 22 seconds, and the thumbnail of each of the earliest image in the corresponding time slot, in this case, the thumbnail image at the time of 6 seconds, and then transmits to the search result display portion 44.

Figure 15:
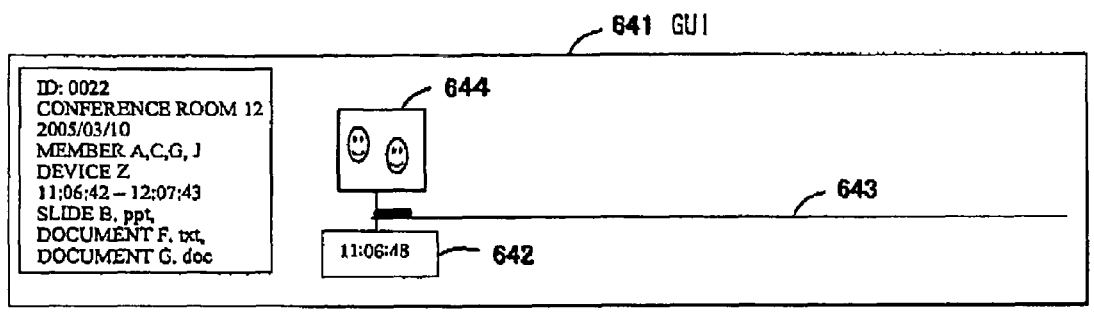
FIG. 15 is a view showing a GUI displayed by the search result display portion in accordance with the third embodiment of the present invention.

FIG. 15 is a view showing a GUI 641 displayed by the search result display portion 44 in accordance with the third embodiment of the present invention. The search result display portion 44 receives the conference TD, date, place, participant, device, time, and document name, and then displays to the user for every record as shown in FIG. 15 (step S400 in FIG. 6). The search result display portion 44 displays a timeline 643 for every conference. The initial image is formed into a thumbnail 644, and is displayed together with time information 642 in the corresponding position of the timeline 643. At this time, the search result display portion 44 displays a thick line on the timeline 643. The thick line has a length equal to the period while the corresponding slide was being displayed. The search result display portion 44 detects that the user clicked the thumbnail 644, requests the conference DB 30 for the corresponding video image, and opens a window for video reproduction and reproduces from the initial image.

A description will now be given of a fourth embodiment of the present invention. The fourth embodiment of the present invention will exemplify a case where a scene is searched by specifying a projection position of the document. Also in the fourth embodiment, FIG. 3 and FIG. 6 will also be referred to in the description hereafter, as described in the first embodiment of the present invention.

FIG. 17 is a view showing an example of a data structure of the conference DB in accordance with the fourth embodiment of the present invention. The conference DB 30 stores the data shown in FIG. 17. One record is prepared for one conference, and stores the conference ID, data, place, member, device, and time in the first line thereof. In the second line, the name of the document that was used in the conference is listed as the document information. The linked page or URL, in which the video image is stored, is listed in the image field as the image information. The operation states are subsequently recorded. The operation states record the position and the remark state of each participant in every second and the position and operation state of each device together with the elapsed time. For example, 00:00:07|A:031|C:065|X:133|S:135|Slide H.ppt/Purpose and Problem@Projection surface A+Document J.txt@Projection surface B This example denotes that a participant A is not making remarks (shown by 0) when 7 seconds has passed since the start of the conference and is located on a position of 3 in X-axis direction and 1 in Y-axis direction, when the room is segmented into rectangular blocks.

A participant C is not making remarks (shown by 0), and is located on a position of 6 in X-axis direction and 5 in Y-axis direction. With respect to devices X and S, the power is on (shown by 1), and the devices X and S are respectively located on a position of 3 in X-axis direction and 3 in Y-axis direction and on a position of 3 in X-axis direction and 5 in Y-axis direction. In addition, the slide "Purpose and Problem" in the file having a name of "slide H. ppt" is projected onto a projection surface A (projection position), and "Document J.txt" is simultaneously projected onto a projection surface B. The afore-mentioned contents may be input manually or may be acquired automatically. If the contents are acquired automatically, the device (projector) that project onto projection surfaces 253 and 254 are predetermined, and then the information obtained by the software that monitors open and close of the document file and the change of the slide may be input on the personal computer connected to the projector.

Figure 16:
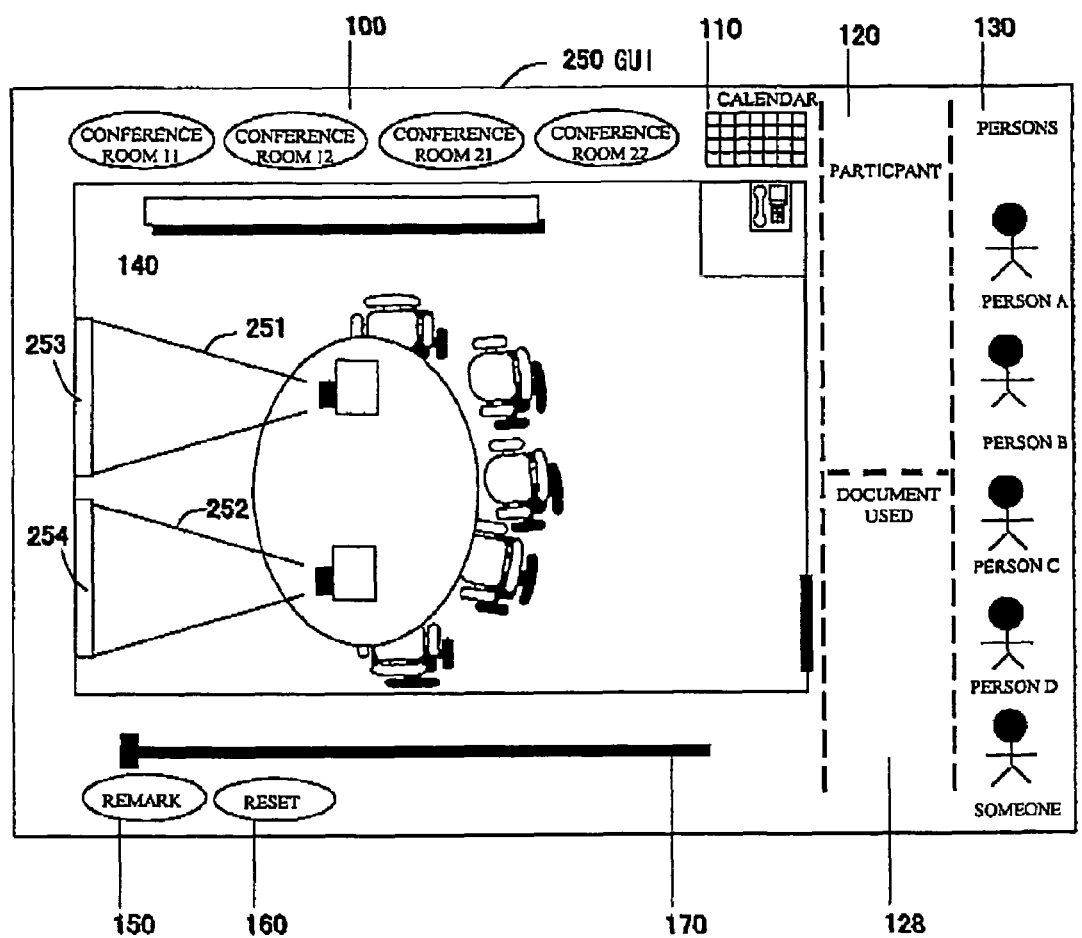
FIG. 16 is a view illustrating a GUI displayed by the search request receiving portion in accordance with a fourth embodiment of the present invention.

FIG. 16 is a view illustrating a GUI 250 displayed by the search request receiving portion 41 in accordance with the fourth embodiment of the present invention. FIG. 16 exemplifies that the search request receiving portion 41 displays a layout chart of the space on the retrieval screen and receives the search request in a format where an indicator indicates the position of the object in the space and another indicator indicates the position of the document, and both of them are arranged in the layout chart.

First, the user gives an instruction on the conference that the user likes to view, to the GOI 250. The instruction is given by selecting the conference room that corresponds to one of the conference room select buttons 100, shown in FIG. 16. The search request receiving portion 41 detects the instruction on the conference room select button 100, obtains the layout chart of the corresponding conference from the conference room person DB 42, and displays it on the conference room display area 140. FIG. 16 exemplifies that a conference room 22 is selected and the layout chart thereof is displayed. The search request receiving portion 41 displays projector lamps 251 and 252 on the layout chart of the conference to display the projection surfaces 253 and 254. The user drags and drops the "Document J.txt" of a text document being displayed on the user a desktop computer to put the document onto the projection surface 254 in the layout of the conference. Here, "Document J.txt" of a text document is used for indicating the position of the document that was displayed.

The search request receiving portion 41 monitors any change on the GUI 250 (step S100 in FIG. 6). If there is a change on the GUI 250, the arrangement of the icons on the GUI 250 is read to issue a query (step S200 in FIG. 6). In this example, the search request receiving portion 41 obtains the file name from the icon of the "Document J.txt", and issues the search request as follows.

Search query: Conference room:22
Document: document J.txt@ Projection surface B

Figure 18:
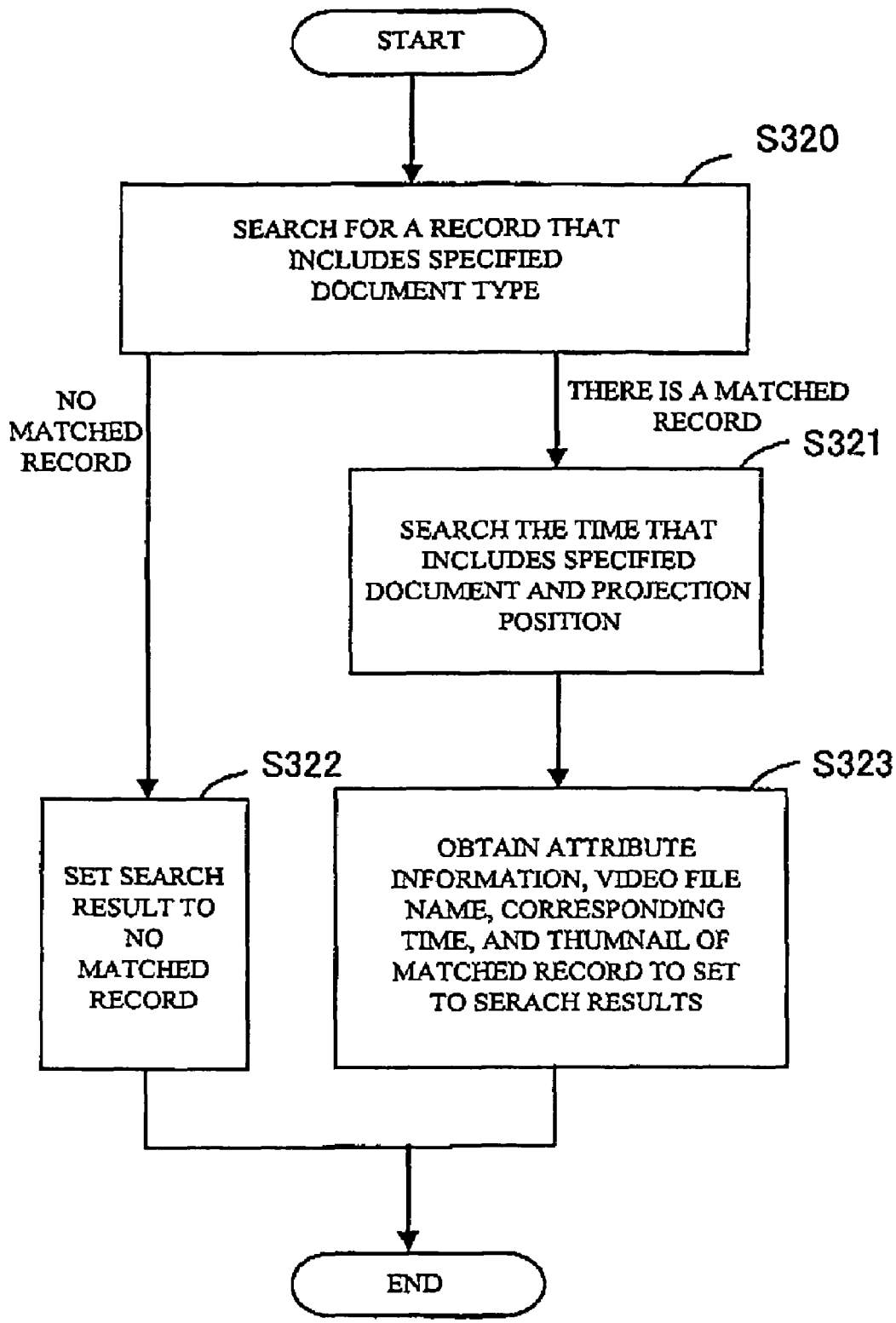
FIG. 18 is a flowchart of the process on the search portion in accordance with the fourth embodiment of the present invention.

The search portion 43 searches the conference DB 30 on the basis of the search request received from the search request receiving portion 41 (step S300 in FIG. 6). FIG. 18 is a flowchart of the process on the search portion 43 in accordance with the fourth embodiment of the present invention. The search portion 43 searches for the record that includes the specified document type (step S320). First, the search portion 43 searches for the conference record that includes the "Document J.txt" of the document name and the conference room 22. In FIG. 17, the record of the conference ID 0025 is searched.

The search portion 43 sets the search result to no matched record, if there is no matched record (step 8322). If there is a corresponding record, processing goes to step S321. The search portion 43 searches the information on the specified document and the projection position, if there is a matched record (step S321). Here, the search portion 43 searches for a line in which the document name "Document J.txt" is projected on the projection surface B in the operation field provided for each second of the record that has been searched (step S321 in FIG. 18). In FIG. 17, the lines from 6 seconds to 2 minutes 22 seconds are searched. The "Document J.txt" is projected at 34 minutes 10 seconds and 34 minutes 11 seconds, yet the projection was carried out onto the projection surface A in both cases, and therefore those lines are not searched.

The search portion 43 obtains the attribute information and video file name of the matched record, the corresponding time, and the thumbnail thereof, to set them to the search result (step S323). Here, the search portion 43 acquires the first line of the matched record, the file name of the video image listed in the image field, and the corresponding time slot, in this case, the lines from 6 seconds to 2 minutes 22 seconds, and the thumbnail of the image of the earliest time in each time slot, in this case, the thumbnail image at the time of 6 seconds, and sends them to the search result display portion 44.

Figure 19:
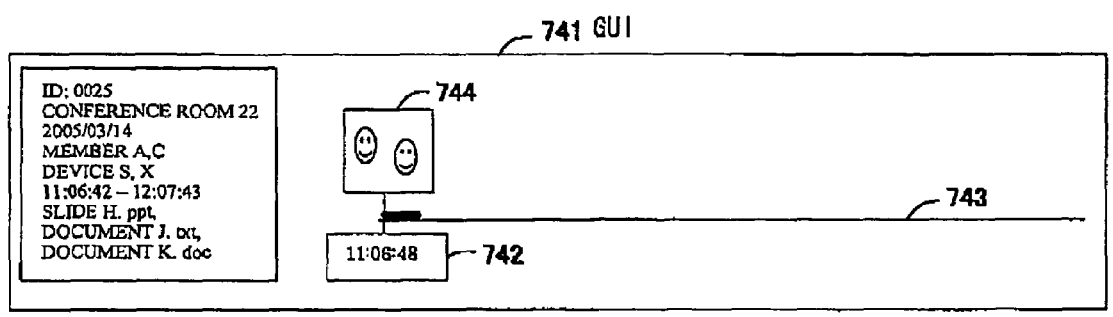
FIG. 19 is a view showing a GUI displayed by the search result display portion in accordance with the fourth embodiment of the present invention.

FIG. 19 is a view showing a GUI 741 displayed by the search result display portion 44 in accordance with the fourth embodiment of the present invention. The search result display portion 44 receives the conference ID, date, place, participant, device, time, and document name, and displays them to the user for each conference, as shown in FIG. 19 (step S400 in FIG. 6). In addition, the search result display portion 44 displays a timeline 743 for each conference, and creates a thumbnail of the initial image to display the thumbnail 744 at a corresponding time position on the timeline 743. At this time, the search result display portion 44 displays a thick line on the timeline 743. The length of the thick line equals to the period while the matched slide was being displayed. The search result display portion 44 detects that the user clicked the thumbnail 744, requests the conference DB 30 for the video image, and opens the window for video reproduction to reproduce the image from the beginning. In this manner, the search of the scene is narrowed by specifying the document and the projection surface.

In accordance with the above-described embodiments of the present invention, the image or the scene of the conference can be specified with the use of the document in hand, without specifying the conference at first. Accordingly, even if the user does not remember in what conference the document was used, the image of the conference in which the document was used can be searched by using the document in hand.

In addition, the above-described embodiments may be used together. For example, the document type icon is created in the document area to apply the document type, and the icon is placed on a projection surface of a conference. This makes it possible to search the scene while a given document type is being projected onto a given projection surface. Specifically, when the conference DB 30 is searched, it's only necessary to search the records for a line that includes both the extension representing the document type and the corresponding projection surface. This makes it possible, for example, to search the image projected on the right surface, which is a slide document, although the document cannot be remembered completely.

Furthermore, in the above-described examples, the document and the projection position have been exemplified as a search clue or keyword. However, as described in Japanese Patent Application Publication No. 2005-234722, another search keyword may be specified simultaneously. For example, In addition to specifying the document, the date may be specified together with the participants. If multiple clues or keywords are designated in the afore-described manner, AND search is carried out to satisfy all the conditions. In this case, the record having the specified date, the specified participant, and the specified document should be searched, and the image file listed in the image field of the record should be viewed.

In the above-mentioned embodiments, the description has been given of the search result display portion 44 that displays the search result on the display device. However, the present invention is not limited to this. For example, the user may be informed of the search result by voice, or by printing on a printer. In addition, the information processor 40 and the conference DB maybe composed of servers, which are respectively connected to the network, so as to receive a request from a client terminal connected via the network. Alternatively, the information processor 40 and the conference DB may be provided as stand-alone computers that receive the above-described processes.

In accordance with the above-mentioned embodiments of the present invention, with respect to the person position specifying apparatus 12 and the device position specifying apparatus 13, the description has been given of the technique that utilizes tags and readers. For example, the tags that emit ultrasonic waves are applied to moving objects. The readers that have been already embedded on the wall catch the ultrasonic waves to estimate the positions of the tags judging from the propagation of the waves. The device operation specifying apparatus 5 may monitor the operations of the devices by monitoring the changes in voltage.

The information processing method of the present invention is realized by the information management apparatus 20 and the information processor 40. The information management apparatus 20 or the information processor 40 utilizes a CPU (Central Processing Unit), ROM (Read Only Memory), RAM (Random Access Memory), or the like. The steps of the information processing method are implemented when CPU executes a given program.

In the information processing system, the receiving portion may receive the information that specifies the document as the search request in a format where file contents of the document are arranged in a given area. Therefore, the user is able to search the scene associated with the document from the image information, by arranging the indicators or selectors that indicate the file contents in the given area. The receiving portion may receive a format of the document as the information that specifies the document. This allows the user to select a document format and search the scene associated with the document in the document format selected from the image.

In the information processing system, the receiving portion may receive the search request in a format where a layout chart of the space is displayed on a retrieval screen and an indicator that indicates a position of an object is arranged on the layout chart of the space. This encourages the user to remember the conference and the related things, because the user is able to indicate the position of the object in the space. The receiving portion may receive the search request in a format where a layout chart of the space is displayed on a retrieval screen and an indicator that indicates a position of the document is displayed on the layout chart of the space. This allows the user to search the scene while remembering where the document was provided.

In the information processing system, the memory portion may store the image information in association with at least one of position information of an object in the space, a remark state of a person in the space, and an operation state of a device in the space, as attribute information; and the receiving portion receives the attribute information as the search request. The image information is managed in association with the attribute information such as the position of the object, the remark state of the person, the operation state of the device. It is possible to search with the attribute information.

In the information processing system, the receiving portion may display at least one of a first selector that selects the space, a second selector that selects a date when the image information was captured, a first area that specifies a person, a second area that specifies the document, a third area that displays a layout chart of the space, and a first indicator that indicates a remark state of a person, and receives the search request according to an operation on a retrieval screen. With the use of the selectors and indicators displayed on the search screen, the user is able to search the scene while remembering the situation in the real space. The information processing system may further include a display portion that displays a downsized image of the scene that has been searched by the search portion to correspond to a timeline of the image information. In the information processing system, the memory portion may store the document in association with each scene of the image information.

In the information processing system, if the document is a slide, the memory portion may store information on each page of the slide in association with each scene of the image information. This makes it possible to search the scene by using each page of the slide. If the document is a slide, the memory portion may store information on a title of each page of the slide in association with each scene of the image information. This makes it possible to search the scene by using the title of each page of the slide.

The information processing method may further include a step of displaying a downsized image of the scene that has been searched by the search portion to correspond to a timeline of the image information. The scene can be understood roughly, by looking at the downsized image of the scene.

Although a few embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2005-236176 filed on Aug. 16, 2005 including specification, claims, drawings, and abstract is incorporated herein by reference in its entirety.

What is claimed is:

1. An information processing system comprising:
   a memory portion that stores image information of a surrounding space in association with a document, the image information being captured by an image capturing portion, the document being used while the surrounding space is being captured,
   a receiving portion that receives information that specifies the document as a search request; and
   a search portion that searches the image information stored on the memory portion for a scene associated with the document specified by the search request, on the basis of the search request.

2. The information processing system, according to claim 1, wherein the receiving portion receives the information that specifies the document as the search request in a format where file contents of the document are arranged in a given area.

3. The information processing system, according to claim 1, wherein the receiving portion receives a format of the document as the information that specifies the document.

4. The information processing system, according to claim 1, wherein the receiving portion receives the search request in a format where a layout chart of the surrounding space is displayed on a retrieval screen and an indicator that indicates a position of an object is arranged on the layout chart of the surrounding space.

5. The information processing system, according to claim 1, wherein the receiving portion receives the search request in a format where a layout chart of the surrounding space is displayed on a retrieval screen and an indicator that indicates a position of the document is displayed on the layout chart of the surrounding space.

6. The information processing system, according to claim 1, wherein:
the memory portion stores the image information in association with at least one of position information of an object in the surrounding space, a remark state of a person in the surrounding space, and an operation state of a device in the surrounding space, as attribute information; and
the receiving portion receives the attribute information as the search request.

7. The information processing system, according to claim 1, wherein the receiving portion displays at least one of a first selector that selects the surrounding space, a second selector that selects a date when the image information was captured, a first area that specifies a person, a second area that specifies the document, a third area that displays a layout chart of the surrounding space, and a first indicator that indicates a remark state of a person, and receives the search request according to an operation on a retrieval screen.

8. The information processing system, according to claim 1, further comprising:
a display portion that displays a downsized image of the scene that has been searched by the search portion to correspond to a timeline of the image information.

9. The information processing system, according to claim 1, wherein the memory portion stores the document in association with each scene of the image information.

10. The information processing system, according to claim 1, wherein if the document is a slide, the memory portion stores information on each page of the slide in association with each scene of the image information.

11. The information processing system, according to claim 1, wherein if the document is a slide, the memory portion stores information on a title of each page of the slide in association with each scene of the image information.

12. An information processing system comprising:
an image capturing portion that captures a surrounding space;
a recognition portion that recognizes a document that is used while the surrounding space is being captured; and
an applying portion that applies information on the document recognized by the recognition portion to image information captured by the image capturing portion, as a search index.

13. The information processing system according to claim 12, wherein if the document is a slide, the applying portion applies information on each page of the slide to each scene of the image information as the search index.

14. The information processing system according to claim 12, wherein if the document is the slide, the applying portion applies information on a title of each page of the slide to each scene of the image information as the search index.

15. An information processing method comprising:
receiving information that specifies a document as a search request;
searching image information stored in a memory portion for a scene associated with the document on the basis of the search request, the image information being captured by an image capturing portion and being stored in the memory portion in association with the document used while a surrounding space is being captured; and
displaying information of the scene that has been searched.

16. The information processing method according to claim 15, further comprising:
displaying a layout chart of the surrounding space on a retrieval screen; and
receiving the search request in a format where the layout chart of the surrounding space is displayed on the retrieval screen and an indicator that indicates a position of an object is arranged on the layout chart of the surrounding space.

17. The information processing method according to claim 15, further comprising:
displaying a layout chart of the surrounding space on a retrieval screen; and
receiving the search request in a format where the layout chart of the surrounding space is displayed on the retrieval screen and an indicator that indicates a position of the document is displayed on the layout chart of the surrounding space.

18. The information processing method, according to claim 15, further comprising steps of:
displaying at least one of a first selector that selects the surrounding space, a second selector that selects a date when the image information is captured, a first area that specifies a person, a second area that specifies the document, a third area that displays a layout chart of the surrounding space, and a first indicator that indicates a remark state of a person; and
receiving the search request according to an operation on a retrieval screen.

19. The information processing method according to claim 15, further comprising:
a step of displaying a downsized image of the scene that has been searched by the search portion to correspond to a timeline of the image information.

20. An information processing method comprising:
capturing a surrounding space;
recognizing a document that is used while the surrounding space is being captured; and
applying information on the document that has been recognized to image information of the surrounding space that has been captured, as a search index.

21. The information processing method according to claim 20, wherein if the document is a slide, the step of applying applies information on each page of the slide to each scene of the image information as the search index.

22. The information processing method according to claim 20, wherein if the document is a slide, the step of applying applies information on a tile of each page of the slide to each scene of the image information as the search index.

* * * * *